(12) United States Patent  
Lu et al.

(10) Patent No.: US 6,556,908 B1  
(45) Date of Patent: Apr. 29, 2003

(54) ATTITUDE SENSING SYSTEM FOR AN AUTOMOTIVE VEHICLE RELATIVE TO THE ROAD

(75) Inventors: Jianbo Lu, Livonia, MI (US); Todd Allen Brown, Dearborn, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/091,264

(22) Filed: Mar. 4, 2002

(51) Int. Cl.$^7$ .............................................. G06F 19/00
(52) U.S. Cl. .......................... 701/38; 701/35; 701/36; 701/45; 180/271
(58) Field of Search ........................... 701/35, 38, 45, 701/36, 37; 180/271, 282; 702/151; 340/440

(56) References Cited

U.S. PATENT DOCUMENTS

| | | |
|---|---|---|
| 4,690,553 A | 9/1987 | Fukamizu et al. ............. 356/51 |
| 4,765,649 A | 8/1988 | Ikemoto et al. ............. 280/5.51 |
| 4,827,416 A | 5/1989 | Kawagoe et al. ........ 219/69.12 |
| 4,888,696 A | 12/1989 | Akatsu et al. ................. 701/38 |
| 5,033,770 A | 7/1991 | Kamimura et al. ....... 280/5.507 |
| 5,058,017 A | 10/1991 | Adachi et al. ................. 701/38 |
| 5,066,041 A | 11/1991 | Kindermann et al. .... 280/5.506 |
| 5,163,319 A | 11/1992 | Spies et al. .................... 73/146 |
| 5,208,749 A | 5/1993 | Adachi et al. ................. 701/38 |
| 5,228,757 A | 7/1993 | Ito et al. ...................... 303/146 |
| 5,247,466 A | 9/1993 | Shimada et al. ............. 702/141 |
| 5,408,411 A | 4/1995 | Nakamura et al. ............ 701/48 |
| 5,598,335 A | 1/1997 | You .............................. 701/65 |
| 5,703,776 A | 12/1997 | Soung .......................... 701/65 |
| 5,732,377 A | 3/1998 | Eckert ........................... 701/83 |
| 5,736,939 A | 4/1998 | Corcoran .................... 340/905 |
| 5,801,647 A | 9/1998 | Survo et al. ................. 340/905 |
| 5,809,434 A | 9/1998 | Ashrafi et al. ................. 701/1 |
| 5,925,083 A | 7/1999 | Ackermann .................. 701/41 |
| 5,944,392 A | 8/1999 | Tachihata et al. ........... 303/112 |
| 6,002,974 A | 12/1999 | Schiffmann .................. 701/36 |
| 6,002,975 A | * 12/1999 | Schiffmann et al. .......... 701/36 |
| 6,038,495 A | 3/2000 | Schiffman ...................... 701/1 |
| 6,040,916 A | 3/2000 | Griesinger .................. 356/448 |
| 6,055,472 A | 4/2000 | Breunig et al. ............... 701/45 |
| 6,065,558 A | 5/2000 | Wielenga ..................... 180/282 |
| 6,141,604 A | 10/2000 | Mattes et al. ................... 701/1 |
| 6,192,305 B1 | * 2/2001 | Schiffmann ................... 701/45 |
| 6,202,020 B1 | 3/2001 | Kyrtsos ........................ 701/80 |
| 6,233,510 B1 | 5/2001 | Platner et al. ................. 701/37 |
| 6,292,759 B1 | * 9/2001 | Schiffmann ................. 702/151 |

FOREIGN PATENT DOCUMENTS

| | | |
|---|---|---|
| EP | 1 002 709 A3 | 5/2000 |
| EP | 1 002 709 A2 | 5/2000 |
| WO | WO 99/64262 | 12/1999 |

* cited by examiner

Primary Examiner—William A. Cuchlinski  
Assistant Examiner—Marthe Y. Marc-Coleman  
(74) Attorney, Agent, or Firm—Gregory P. Brown

(57) ABSTRACT

A stability control system (18) for an automotive vehicle includes a plurality of sensors (28–39) sensing the dynamic conditions of the vehicle. The sensors may include a speed sensor (20), a lateral acceleration sensor (32), a roll rate sensor (34), a yaw rate sensor (20) and a longitudinal acceleration sensor (36). The controller (26) is coupled to the speed sensor (20), the lateral acceleration sensor (32), the roll rate sensor (34), the yaw rate sensor (28) and a longitudinal acceleration sensor (36). The controller (26) determines a global roll attitude and a global pitch attitude from the roll rate, lateral acceleration signal and the longitudinal acceleration signal. The controller determines a roll gradient based upon a past raw roll rate and current raw roll rate, the roll angular rate signal and the lateral acceleration signal, a pitch gradient based upon a past raw pitch rate and current raw pitch rate the calculated pitch angular rate signal and the longitudinal acceleration signal. The controller determines a relative roll and relative pitch as a function of the roll gradient and the pitch gradient.

14 Claims, 5 Drawing Sheets

ATTITUDE SENSING SYSTEM FOR AN AUTOMOTIVE VEHICLE RELATIVE TO THE ROAD

TECHNICAL FIELD

The present invention relates generally to a control apparatus for controlling a system of an automotive vehicle in response to sensed dynamic behavior, and more specifically, to a method and apparatus for controlling the system of the vehicle by determining attitude of the vehicle.

BACKGROUND

Dynamic control systems for automotive vehicles have recently begun to be offered on various products. Dynamic control systems typically control the yaw of the vehicle by controlling the braking effort at the various wheels of the vehicle. Yaw control systems typically compare the desired direction of the vehicle based upon the steering wheel angle and the direction of travel. By regulating the amount of braking at each corner of the vehicle, the desired direction of travel may be maintained. Typically, the dynamic control systems do not address roll of the vehicle. For high profile vehicles in particular, it would be desirable to control the rollover characteristic of the vehicle to maintain the vehicle position with respect to the road. That is, it is desirable to maintain contact of each of the four tires of the vehicle on the road.

In vehicle rollover control, it is desired to alter the vehicle attitude such that its motion along the roll direction is prevented from achieving a predetermined limit (rollover limit) with the aid of the actuation from the available active systems such as controllable brake system, steering system and suspension system. Although the vehicle attitude is well defined, direct measurement is usually impossible.

There are two types of vehicle attitudes needed to be distinguished. One is the so-called global attitude, which is sensed by the angular rate sensors. The other is the relative attitude, which measures the relative angular positions of the vehicle with respect to the road surface on which the vehicle is driven. The global attitude of the vehicle is relative to an earth frame (or called the inertia frame), sea level, or a flat road. It can be directly related to the three angular rate gyro sensors. While the relative attitude of the vehicle measures the relative angular positions of the vehicle with respect to the road surface, which are always of various terrains. Unlike the global attitude, there are no gyro-type sensors which can be directly related to the relative attitude. A reasonable estimate is that a successful relative attitude sensing system must utilize both the gyro-type sensors (when the road becomes flat, the relative attitude sensing system recovers the global attitude) and some other sensor signals.

One reason to distinguish relative and global attitude is due to the fact that vehicles are usually driven on a 3-dimensional road surface of different terrains, not always on a flat road surface. Driving on a road surface with large road bank does increase the rollover tendency, i.e., a large output from the global attitude sensing system might well imply an uncontrollable rollover event regardless of the flat road driving and the 3-D road driving. However driving on a three-dimensional road with moderate road bank angle, the global attitude may not be able to provide enough fidelity for a rollover event to be distinguished. Vehicular rollover happens when one side of the vehicle is lifted from the road surface with a long duration of time without returning back.

If a vehicle is driven on a banked road, the global attitude sensing system will pick up certain attitude information even when the vehicle does not experience any wheel lifting (four wheels are always contacting the road surface). Hence a measure of the relative angular positions of the vehicle with respect to the portion of the road surface on which the vehicle is driven provides more fidelity than global attitude to sense the rollover event.

The vehicle rollover sensing system used for deploying safety-related devices has been proposed in U.S. Pat. Nos. 6,002,975, 6,038,495, EP 1002709A2, where a stand-alone sensor module including 5 sensors are used including the roll/pitch angular rate sensors, later/longitudinal/vertical acceleration sensors. These systems sense the global attitude of a vehicle without considering the relative attitude of the vehicle with respect to the road surfaces. Due to the stand-alone nature of the sensing module, it does not share internal information with vehicle dynamics control systems.

The rollover control system using brake controls has been proposed in U.S. Pat. No. 6,065,558 ("Anti-Rollover Brake System"), where the claimed sensor setting could be any of the following: (1) a lateral accelerometer; (2) a sensor for measuring the body roll angle; (3) an accelerometer, a gyroscope, a roll rate senor, and sensors measuring the distances between the vehicle and the wheels to measure the roll angle of the vehicle. In the current invention, a different sensor set is used. The used sensors includes those used in the vehicle yaw stability control (lateral/longitudinal accelerometers, yaw angular rate sensor, wheel speeds and steering angle) and an extra roll rate angular sensor. Also, notice that U.S. Pat. No. 6,065,558 does not intend to distinguish between global and relative attitude of a vehicle reflected by the Euler angles.

Another vehicle attitude sensing method has been proposed in U.S. Pat. No. 5,408,411 ("System For Predicting Behavior Of Automotive Vehicle And For Controlling Vehicular Behavior Based Thereon"). Where a sensor module using six linear accelerations is mounted on the vehicle to get vehicular attitude information.

It would therefore be desirable to provide an attitude control system to predict attitude angle for vehicle dynamics control that includes the interdependency among the roll, pitch and yaw motions while compensating for long term maneuvers.

SUMMARY OF THE INVENTION

The present invention aims to estimate and predict the vehicular attitude used in a rollover control system which can prevent the vehicle from rolling over. The estimated and predicted variables are used for setting a rollover control action flag and as the feedback signals to construct the desired control forces for controlling roll stability or activate other safety devices. In detail, the rollover control action needs the information from the vehicle attitude sensing system, the available sensors, and the driving/road condition identifiers. The rollover control flag is set based on a rollover logic process. In case a positive determination of vehicle rollover is deemed from this rollover logic process, the control commands will be computed by feeding back the estimated vehicle attitude variables. The control command output is further sent to the ECU of the hardware to activate the system. In detail, the vehicle attitude sensing system uses all the sensors available for yaw stability control (including a later accelerometer, a longitudinal accelerometer, a yaw angular rate, a steering angle sensor and the wheel speed sensor signals) together with a roll angular rate sensor. The vehicle attitude is characterized by the relative Euler angles of the car body with respect to the road surface and by the global Euler angles of the car body with respect to the sea level. The vehicle attitude estimation and prediction utilize both the kinematic and the dynamic relationships derived from vehicle dynamics and vehicle dynamic models to relate the desired motion variables with the measured sensor signals.

In one aspect of the invention, a stability control system for an automotive vehicle includes a plurality of sensors sensing the dynamic conditions of the vehicle. The sensors may include a speed sensor, a lateral acceleration sensor, a roll rate sensor, a yaw rate sensor and a longitudinal acceleration sensor. The controller is coupled to the speed sensor, the lateral acceleration sensor, the roll rate sensor, the yaw rate sensor and a longitudinal acceleration sensor. The controller determines a global roll attitude and a global pitch attitude from the roll rate, lateral acceleration signal and the longitudinal acceleration signal. The controller determines a roll gradient based upon a past raw roll rate and current raw roll rate, the roll angular rate signal and the lateral acceleration signal, a pitch gradient based upon a past raw pitch rate and current raw pitch rate the calculated pitch angular rate signal and the longitudinal acceleration signal. The controller determines a relative roll and relative pitch as a function of the roll gradient and the pitch gradient.

In a further aspect of the invention, a method of controlling roll stability of the vehicle comprises the steps of:

measuring a roll rate of the vehicle body;

measuring a lateral acceleration of the vehicle body;

measuring the longitudinal acceleration of the vehicle body;

measuring the yaw rate of the vehicle body; and determining relative roll angle, the relative pitch angle, the global roll and global pitch angle in response to the roll rate, the yaw rate, the lateral acceleration and the longitudinal acceleration.

Reducing system cost is typically a goal in automotive systems. Since one of the three angular rate signals (pitch rate signal) can be predicted from the other available signals, the cost reduction of the system is possible by eliminating a pitch rate sensor. Also, vertical acceleration sensor may be eliminated to further reduce cost.

Other advantages and features of the present invention will become apparent when viewed in light of the detailed description of the preferred embodiment when taken in conjunction with the attached drawings and appended claims.

DESCRIPTION OF THE PREFERRED EMBODIMENT

Figure 1:
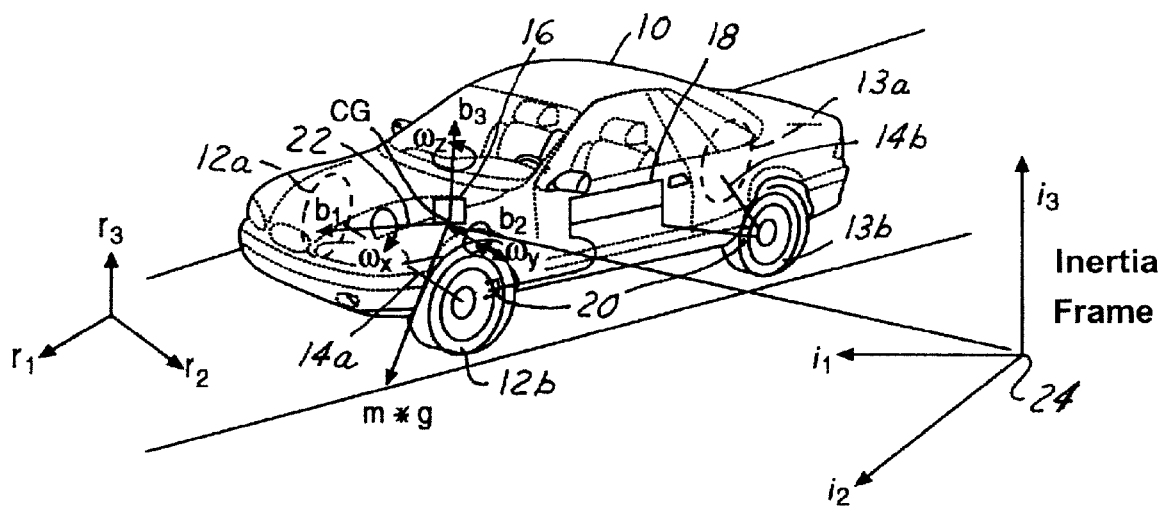
FIG. 1 is a diagrammatic view of a vehicle with variable vectors and coordinator frames according to the present invention.

In the following figures the same reference numerals will be used to identify the same components. The present invention is preferably used in conjunction with a rollover control system for a vehicle. However, the present invention may also be used with a deployment device such as airbag or roll bar. The present invention will be discussed below in terms of preferred embodiments relating to an automotive vehicle moving in a three-dimensional road terrain.

Referring to FIG. 1, an automotive vehicle 10 with a safety system of the present invention is illustrated with the various forces and moments thereon during a rollover condition. Vehicle 10 has front right and front left tires 12a and 12b and rear right tires 13a and left rear tires 13b respectively. The vehicle 10 may also have a number of different types of front steering systems 14a and rear steering systems 14b including having each of the front and rear wheels configured with a respective controllable actuator, the front and rear wheels having a conventional type system in which both of the front wheels are controlled together and both of the rear wheels are controlled together, a system having conventional front steering and independently controllable rear steering for each of the wheels or vice versa. Generally, the vehicle has a weight represented as Mg at the center of gravity of the vehicle, where g=9.8 m/s$^2$ and M is the total mass of the vehicle.

As mentioned above, the system may also be used with active/semi-active suspension systems, anti-roll bar or other safety devices deployed or activated upon sensing predetermined dynamic conditions of the vehicle.

The sensing system 16 is coupled to a control system 18. The sensing system 16 preferably uses a standard yaw stability control sensor set (including lateral accelerometer, yaw rate sensor, steering angle sensor and wheel speed sensor) together with a roll rate sensor and a longitudinal accelerometer. The various sensors will be further described below. The wheel speed sensors 20 are mounted at each corner of the vehicle, and the rest of the sensors of sensing system 16 are preferably mounted directly on the center of gravity of the vehicle body, along the directions x,y and z shown in FIG. 1. As those skilled in the art will recognize, the frame from $b_1$, $b_2$ and $b_3$ is called a body frame 22, whose origin is located at the center of Do gravity of the car body, with the $b_1$ corresponding to the x axis pointing forward, $b_2$ corresponding to the y axis pointing off the driving side (to the left), and the $b_3$ corresponding to the z axis pointing upward. The angular rates of the car body are denoted about their respective axes as $w_x$ for the roll rate, $w_y$ for the pitch rate and $w_z$ for the yaw rate. The present invention calculations preferably take place in an inertial frame 24 that may be derived from the body frame 22 as described below.

The angular rate sensors and the accelerometers are mounted on the vehicle car body along the body frame directions $b_1$, $b_2$ and $b_3$, which are the x-y-z axes of the vehicle's sprung mass.

The longitudinal acceleration sensor is mounted on the car body located at the center of gravity, with its sensing direction along $b_1$-axis, whose output is denoted as $a_x$. The lateral acceleration sensor is mounted on the car body located at the center of gravity, with its sensing direction along $b_2$-axis, whose output is denoted as $a_y$.

The other frame used in the following discussion includes the road frame, as depicted in FIG. 1. The road frame system $r_1 r_2 r_3$ is fixed on the driven road surface, where the $r_3$ axis is along the average road normal direction computed from the normal directions of the four tire/road contact patches.

In the following discussion, the Euler angles of the body frame $b_1 b_2 b_3$ with respect to the road frame $r_1 r_2 r_3$ are denoted as $\theta_{xbr}, \theta_{ybr}$ and $\theta_{zbr}$, which are also called the relative Euler angles.

The present invention estimates the relative Euler angles $\theta_{xbr}$ and $\theta_{ybr}$ based on the available sensor signals and the signals calculated form the measured values.

Figure 2:
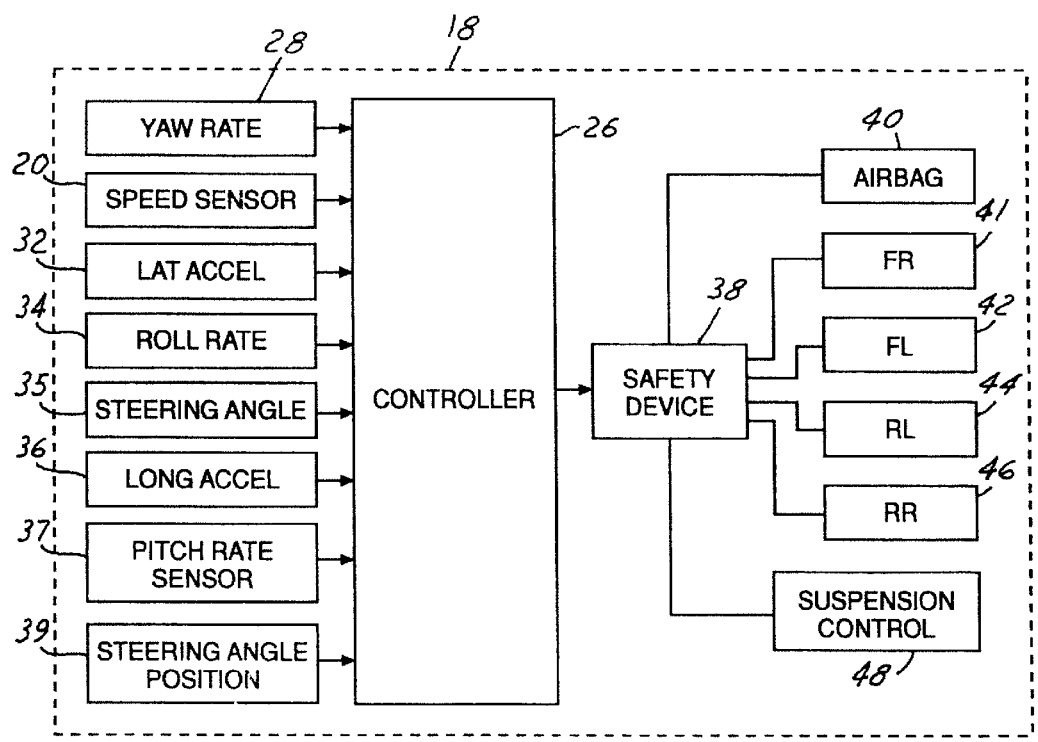
FIG. 2 is a block diagram of a stability system according to the present invention.

Referring now to FIG. 2, roll stability control system 18 is illustrated in further detail having a controller 26 used for receiving information from a number of sensors which may include a yaw rate sensor 28, a speed sensor 20, a lateral acceleration sensor 32, a roll rate sensor 34, a steering angle sensor 35, a longitudinal acceleration sensor 36, a pitch rate sensor 37 and steering angle position sensor 39.

In the preferred embodiment only two axial rate sensors are used. When two of these axial rates are known, the other may be derived using other commonly available sensors.

That is, pitch rate sensor 37 is illustrated, it can be eliminated in the preferred embodiment.

In the preferred embodiment the sensors are located at the center of gravity of the vehicle. Those skilled in the art will recognize that the sensor may also be located off the center of gravity and translated equivalently thereto.

Lateral acceleration, roll orientation and speed may be obtained using a global positioning system (GPS). Based upon inputs from the sensors, controller 26 may control a safety device 38. Depending on the desired sensitivity of the system and various other factors, not all the sensors 28–37 may be used in a commercial embodiment. Safety device 38 may control an airbag 40 or a steering actuator or braking actuator at one or more of the wheels 41, 42, 44, 46 of the vehicle. Also, other vehicle components such as a suspension control 48 may be used to adjust the suspension to prevent rollover.

Roll rate sensor 34 and pitch rate sensor 37 may sense the roll condition of the vehicle based on sensing the height of one or more points on the vehicle relative to the road surface. Sensors that may be used to achieve this include a radar-based proximity sensor, a laser-based proximity sensor and a sonar-based proximity sensor.

Roll rate sensor 34 and pitch rate sensor 37 may also sense the roll condition based on sensing the linear or rotational relative displacement or displacement velocity of one or more of the suspension chassis components which may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The roll condition may also be sensed by sensing the force or torque associated with the loading condition of one or more suspension or chassis components including a pressure transducer in an act of air suspension, a shock absorber sensor such as a load cell, a strain gauge, the steering system absolute or relative motor load, the steering system pressure of the hydraulic lines, a tire laterally force sensor or sensors, a longitudinal tire force sensor, a vertical tire force sensor or a tire sidewall torsion sensor.

The roll condition of the vehicle may also be established by one or more of the following translational or rotational positions, velocities or accelerations of the vehicle including a roll gyro, the roll rate sensor 34, the yaw rate sensor 28, the lateral acceleration sensor 32, a vertical acceleration sensor, a vehicle longitudinal acceleration sensor, lateral or vertical speed sensor including a wheel-based speed sensor, a radar-based speed sensor, a sonar-based speed sensor, a laser-based speed sensor or an optical-based speed sensor.

Steering control 38 may control the position of the front right wheel actuator 40, the front left wheel actuator 42, the rear left wheel actuator 44, and the right rear wheel actuator 46. Although as described above, two or more of the actuators may be simultaneously controlled. For example, in a rack-and-pinion system, the two wheels coupled thereto are simultaneously controlled. Based on the inputs from sensors 28 through 39, controller 26 determines a roll condition and controls the steering position of the wheels.

Speed sensor 30 may be one of a variety of speed sensors known to those skilled in the art. For example, a suitable speed sensor may include a sensor at every wheel that is averaged by controller 26. Preferably, the controller translates the wheel speeds into the speed of the vehicle. Yaw rate, steering angle, wheel speed and possibly a slip angle estimate at each wheel may be translated back to the speed of the vehicle at the center of gravity. Various other algorithms are known to those skilled in the art. Speed may also be obtained from a transmission sensor. For example, if speed is determined while speeding up or braking around a corner, the lowest or highest wheel speed may not be used because of its error. Also, a transmission sensor may be used to determine vehicle speed.

Connecting the Relative Attitudes with the Relative Corner Displacements

In operation, the method according to the present invention first correlates the relative attitude with the displacement at each corner of the vehicle. Consider a vector with x-y-z coordinates as $x_b, y_b, z_b$ of its end point in the body frame of FIG. 1. The z coordinator of the end point of the same vector measured in the road frame can be computed from the Euler transformation $$z_r = -x_b \sin(\theta_{ybr}) + y_b \sin(\theta_{xbr})\cos(\theta_{ybr}) + z_b \cos(\theta_{xbr})\cos(\theta_{ybr}) \quad (1)$$

Let l be the half of the wheel track; $t_f$ and $t_r$ be the distances from the center of gravity of the car body to the front and rear axles; h be the distance between the bottom of the vehicle body and the center of gravity of the vehicle along the body z-axis; $\theta_{xbr}$ and $\theta_{ybr}$ are the relative roll and pitch angles. Then in the body frame the four corners of the vehicle body where suspensions are connected with the wheel have the following coordination:

LF Corner: $x=t_f, y=l, z=-h$

RF Corner: $x=t_f, y=-l, z=-h$

LR Corner: $x=-t_r, y=l, z=-h$

RR Corner: $x=-t_r, y=-l, z=-h$ \quad (2)

Let $z_{lf}, z_{rf}, z_{lr}$ and $z_{rr}$ be the relative displacements of the vehicle corners at the left-front, right-front, left-rear and right-rear locations, which are measured along the direction perpendicular to the average road surface. By using the transformation in Equation (1), those corner displacements relative to the road surface can be expressed as the function of the relative roll and pitch angles $\theta_{xbr}$ and $\theta_{ybr}$ $$z_{lf} = -t_f \sin(\theta_{ybr}) + l \sin(\theta_{xbr})\cos(\theta_{ybr}) + (z_{cg}-h)\cos(\theta_{xbr})\cos(\theta_{ybr})$$

$$z_{rf} = -t_f \sin(\theta_{ybr}) - l \sin(\theta_{xbr})\cos(\theta_{ybr}) + (z_{cg}-h)\cos(\theta_{xbr})\cos(\theta_{ybr})$$

$$z_{lr} = t_r \sin(\theta_{ybr}) + l \sin(\theta_{xbr})\cos(\theta_{ybr}) + (z_{cg}-h)\cos(\theta_{xbr})\cos(\theta_{ybr})$$

$$z_{rr} = t_r \sin(\theta_{ybr}) - l \sin(\theta_{xbr})\cos(\theta_{ybr}) + (z_{cg}-h)\cos(\theta_{xbr})\cos(\theta_{ybr}) \quad (3)$$

where $z_{cg}$ is the relative displacement of the center of gravity of the vehicle with respect to the road surface, but measured along the body z-axis.

Figure 3:
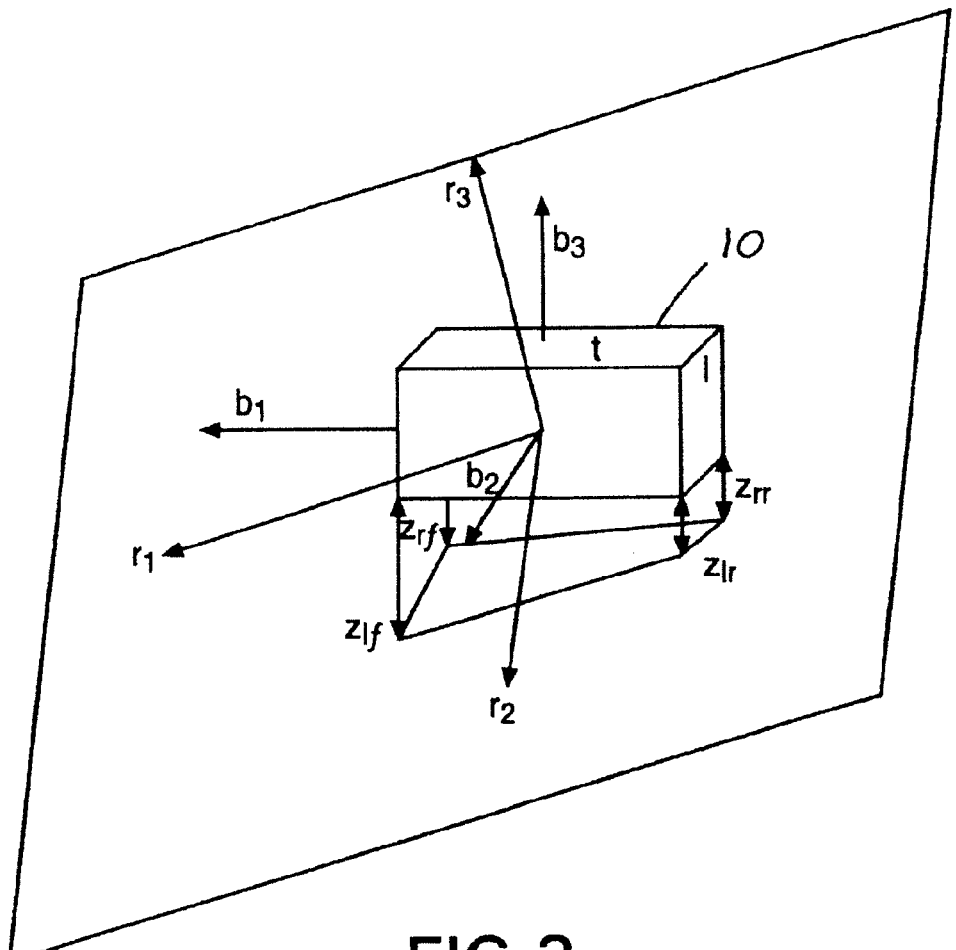
FIG. 3 is a diagrammatic view showing the displacement (relative to road surface) of the four corners of the vehicle body along the body-fixed vertical axis.

Referring now to FIG. 3, the four equations of Equation (3) pose four constraints on a set of seven variables: $z_{lf}, z_{rf}, z_{lr}, z_{rr}, z_{cg}, \theta_{xbr}$ and $\theta_{ybr}$. Hence a combination of three variables can be used to compute the rest of the variables. Since $\theta_{xbr}$ and $\theta_{ybr}$ are of interest in the present invention, the possible choices are choosing three variables from $z_{lf}, z_{rf}, z_{lr}, z_{rr}$ and $z_{cg}$ to characterize $\theta_{xbr}$ and $\theta_{ybr}$. The direct measurement of any of $z_{lf}, z_{rf}, z_{lr}, z_{rr}$, and $z_{cg}$ is relatively expensive (for example, expensive laser distance sensors can be used). Hence, measuring any three of $z_{lf}, z_{rf}, z_{lr}, z_{rr}$ and $z_{cg}$ may be cost prohibitive in a commercial environment with current technology. However, certain linear combinations of the four corner displacements $z_{lf}, z_{rf}, z_{lr}$ and $z_{rr}$ can be related to the available sensors through dynamics. When linear combinations are related to the relative roll and pitch Euler angles $\theta_{xbr}$ and $\theta_{ybr}$, $\theta_{xbr}$ and $\theta_{ybr}$ may be characterized from the available sensor signals. In the following, the effort has been focused on finding those linear combinations of $z_{lf}, z_{rf}, z_{lr}, z_{rr}$ which bridges between $\theta_{xbr}$ and $\theta_{ybr}$, and the available sensor signals including the lateral and longitudinal accelerations, the roll and yaw angular rates and the wheel speed sensor signals.

The Relative Attitudes Based on the Linear Combinations of the Corner Displacements The linear combinations of $z_{lf}, z_{rf}, z_{lr}, z_{rr}$, which serve as bridges to connect $\theta_{xbr}$ and $\theta_{ybr}$ with the available sensor signals are the following variables, which are called the relative roll and pitch gradients $$\Theta_x = \frac{z_{lf} - z_{rf} + z_{lr} - z_{rr}}{4l} \quad (4)$$

$$\Theta_y = \frac{z_{lf} + z_{rf} - z_{lr} - z_{rr}}{2(t_f + t_r)}$$

$\Theta_x$ and $\Theta_y$ is related to the relative roll and pitch attitudes by manipulating the equations in (3). The final formula for the relative pitch Euler angle is $$\theta_{ybr} = \sin^{-1}\{\Theta_y\} \quad (5)$$

and the final formula for the relative roll Euler angle $\theta_{xbr}$ is $$\theta_{xbr} = \sin^{-1}\left\{\frac{\Theta_x}{\cos(\theta_{ybr})}\right\} \quad (6)$$

On the other hand $\Theta_x$ and $\Theta_y$ can be further related to the available sensor signals through dynamic equations which describe the vehicle body dynamics. $\Theta_x$ and $\Theta_y$ will be first broken into two portions, and related to the sensor signals.

Roll and Pitch Gradients Due to Suspension and Wheel Motions

Figure 4:
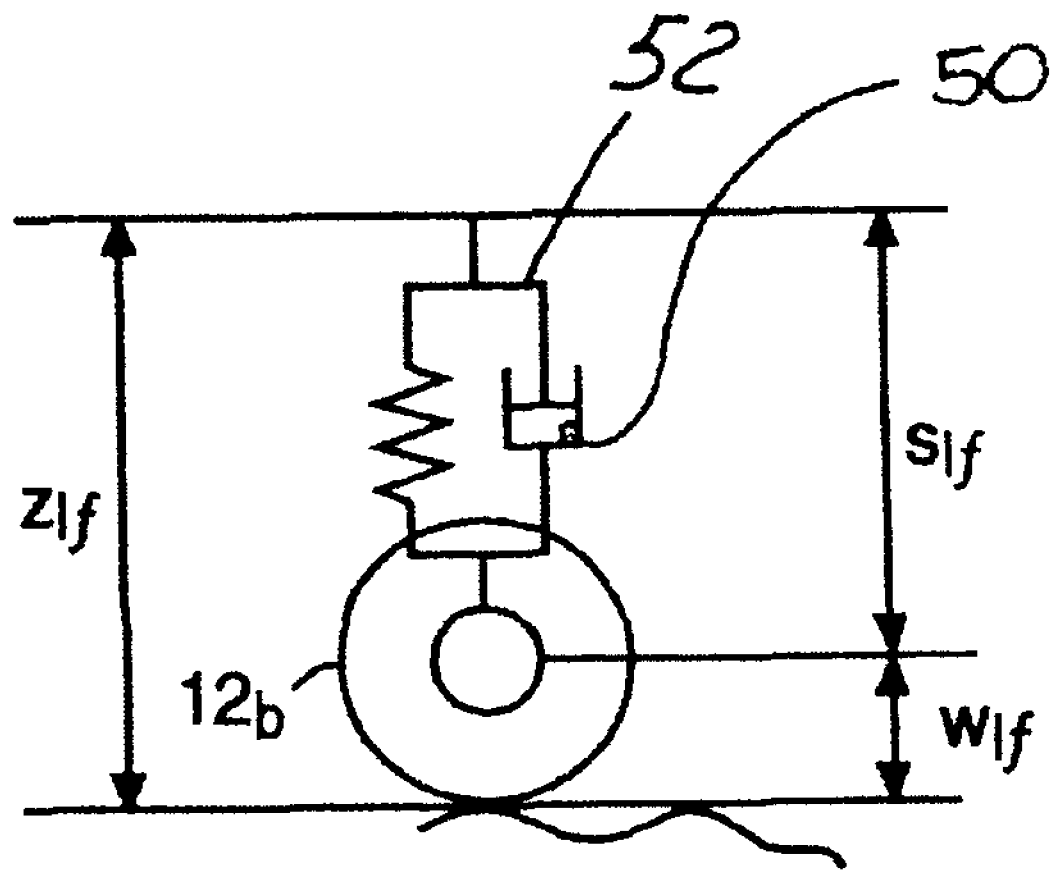
FIG. 4 is a diagrammatic view showing the two components of the relative corner displacement depicted in FIG. 3.

As shown in FIG. 4, a portion of the left front wheel 12b and suspension 52 are illustrated, $z_{lf}$ can be further expressed as the sum of the two parts: the suspension stroke $s_{lf}$ as measured by sensor 50 and the wheel displacement $w_{lf}$ with respect to the road surface along the direction perpendicular to the road surface. The same is true for the rest of the corner locations. The sensor 50 may measures the change in the distance from the vehicle body to the wheel. If the four suspension strokes are $s_{lf}, s_{rf}, s_{lr}$ and $s_{rr}$, and the four wheel vertical motions are $w_{lf}, w_{rf}, w_{lr}$ and $w_{rr}$, then:

$$z_{lf} = s_{lf} + w_{lf}$$

$$z_{rf} = s_{rf} + w_{rf}$$

$$z_{lr} = s_{lr} + w_{lr}$$

$$z_{rr} = s_{rr} + w_{rr} \quad (7)$$

The relative roll and pitch gradients $\Theta_x$ and $\Theta_y$ may be broken into pieces according to the suspension motion and the wheel vertical motion. The roll and the pitch gradients $\Theta_{x\text{-}susp}$ and $\Theta_{y\text{-}susp}$ due to suspension motions $s_{lf}, s_{rf}, s_{lr}$ and $s_{rr}$ may be defined as:

$$\Theta_{y\text{-}susp} = \frac{s_{lf} + s_{rf} - s_{lr} - s_{rr}}{2(t_f + t_r)} \quad (8)$$

$$\Theta_{x\text{-}susp} = \frac{s_{lf} - s_{rf} + s_{lr} - s_{rr}}{4l}$$

and the roll and pitch gradients $\Theta_{x\text{-}whl}$ and $\Theta_{y\text{-}whl}$ due to the wheel vertical motion defined as:

$$\Theta_{y\text{-}whl} = \frac{w_{lf} + w_{rf} - w_{lr} - w_{rr}}{2(t_f + t_r)} \quad (9)$$

$$\Theta_{x\text{-}whl} = \frac{w_{lf} - w_{rf} + w_{lr} - w_{rr}}{4l}$$

Then $$\Theta_y = \Theta_{y\text{-}susp} + \Theta_{y\text{-}whl}$$

$$\Theta_x = \Theta_{x\text{-}susp} + \Theta_{x\text{-}whl} \quad (10)$$

The relative Euler angles $\theta_{xbr}$, and $\theta_{ybr}$ can be also written as two parts:

$$\theta_{ybr} = \sin^{-1}\{\Theta_{y\text{-}susp} + \Theta_{y\text{-}whl}\} \quad (11)$$

$$\theta_{xbr} = \sin^{-1}\left\{\frac{\Theta_{x\text{-}susp} + \Theta_{x\text{-}whl}}{\cos(\theta_{ybr})}\right\}$$

Since there are no restrictions in Equation (11), it is valid regardless of if the four wheels of the vehicle contact the road surface or lift from the road, as soon as the accurate characterization of the roll and pitch gradients $\Theta_{x\text{-}susp}$ and $\Theta_{y\text{-}susp}$, and $\Theta_{x\text{-}whl}$ and $\Theta_{y\text{-}whl}$ are available. Hence in the following $\Theta_{x\text{-}susp}, \Theta_{y\text{-}susp}, \Theta_{x\text{-}whl}$ and $\Theta_{y\text{-}whl}$ may be computed based on the available sensor signals.

Estimate the Roll and Pitch Gradients

From the formula in Equation (8), the roll and pitch gradients $\Theta_{x\text{-}susp}$ and $\Theta_{y\text{-}susp}$ are related to the suspension stroke. The estimation schemes are sought for computing $\Theta_{x\text{-}susp}$ and $\Theta_{y\text{-}susp}$ from the available sensor signals.

Consider in Equation (3) that the distance differences between the left side corners and right side corners are equal, that is:

$$z_{lf} - z_{rf} = z_{lr} - z_{rr} \quad (12)$$

or:

$$s_{lf} - s_{rf} = s_{lr} - s_{rr} + [w_{lf} - w_{rr} - w_{lf} + w_{rf}] \quad (13)$$

Since the tire deflections are much smaller than the suspension stroke, from (13) it is reasonable to say $$s_{lf}-s_{rf} \gg s_{lr}-s_{rr} \quad (14)$$

or rewrite this as:

$$\frac{s_{lf}-s_{rf}}{s_{lr}-s_{rr}} \approx 1 \quad (15)$$

Hence, for any given constant weight k, we have:

$$\Theta_{x\text{-}susp} \approx \frac{\kappa(s_{lf}-s_{rf})+s_{lr}-s_{rr}}{2l(\kappa+1)} \quad (16)$$

In the sequential discussion, the Equation (16) may be used to describe the roll gradient $\Theta_{x\text{-}susp}$.

$\Theta_{x\text{-}susp}$ and $\Theta_{y\text{-}susp}$ must then be related to the available sensor signals. The following dynamic relationship which are obeyed by the car body through the Newton law described around the c.g. of the vehicle body $$I_x \dot{\omega}_x = h_y \sum_{i=1}^{4} F_{yi} + l(K_f s_{lf} + D_f \dot{s}_{lf}) - l(K_f s_{rf} + D_f \dot{s}_{rf}) + \quad (17)$$

$$l(K_r s_{lr} + D_r \dot{s}_{lr}) - l(K_r s_{rr} + D_r \dot{s}_{rr}) +$$

$$K_{anti\text{-}roll\text{-}f} \frac{(s_{lf}-s_{rf})}{l} + K_{anti\text{-}roll\text{-}r} \frac{(s_{lr}-s_{rr})}{l}$$

$$I_y \dot{\omega}_y = h_x \sum_{i=1}^{4} F_{xi} + t_f(K_f s_{lf} + D_f \dot{s}_{lf}) + t_f(K_f s_{rf} + D_f \dot{s}_{rf}) -$$

$$t_r(K_r s_{lr} + D_r \dot{s}_{lr}) - t_r(K_r s_{rr} + D_r \dot{s}_{rr})$$

$$M_s a_y = \sum_{i=1}^{4} F_{yi}$$

$$M_s a_x = \sum_{i=1}^{4} F_{xi}$$

where $I_x$ and $I_y$ are the momentum of inertia of the car body with respect to the x and y axis respectively; $M_s$ is the sprung mass (the mass of the car body); $h_x$ is the c.g. height of the car body with respect to the top of the suspension; $K_f$ and $K_r$ are the front and rear suspension spring rates with unit N/m. $K_{anti\text{-}roll\text{-}f}$ and $K_{anti\text{-}roll\text{-}r}$ are the stiffnesses for the front and the rear anti-roll bar, with unit Nm/rad. $D_f$ and $D_r$ are the front and the rear suspension damper rates; $F_{xi}$ is the ith suspension force applied to the car body along the body fixed direction $b_1$, and $F_{yi}$ is the ith suspension force applied to the car body along the body fixed direction $b_2$.

Define a weight:

$$k = \frac{l^2 K_f + K_{anti\text{-}roll\text{-}f}}{l^2 K_r + K_{anti\text{-}roll\text{-}r}} \quad (18)$$

Since the damping rates are usually proportional to the spring rates for suspensions, it is reasonable to assume:

$$\frac{l^2 D_f + D_{anti\text{-}roll\text{-}f}}{l^2 D_r + D_{anti\text{-}roll\text{-}r}} \approx k \quad (19)$$

For a well balanced vehicle, the normal dead loading applied to the vehicle should not generate significant body attitude variation when the vehicle is parked on a flat road. That is, the roll and pitch attitude angles induced by the normal dead loading during flat road parking should be close to zero. For this reason, it is reasonable to assume the following holds:

$$t_r K_r = t_f K_f \quad (20)$$

Similar argument can be used for suspension damping rates.

Through algebraic manipulation the first two equations in Equation (17) can be rewritten as the following:

$$I_x \dot{\omega}_x = h_y M_s a_y + \left(lK_r + \frac{K_{anti\text{-}roll\text{-}r}}{l}\right)[k(s_{lf}-s_{rf})+(s_{lr}-s_{rr})] + \quad (21)$$

$$\left(lD_r + \frac{D_{anti\text{-}roll\text{-}r}}{l}\right)[k(\dot{s}_{lf}-\dot{s}_{rf})+(\dot{s}_{lr}-\dot{s}_{rr})]$$

$$I_y \dot{\omega}_x = h_x M_s a_x + t_r K_r(s_{lf}+s_{rf}-s_{lr}-s_{rr}) +$$

$$t_r D_r(\dot{s}_{lf}+\dot{s}_{rf}-\dot{s}_{lr}-\dot{s}_{rr})$$

Using the definition of $\Theta_{x\text{-}susp}$ and $\Theta_{y\text{-}susp}$, Equation (21) can be rewritten as:

$$\dot{w}_x = c_0 a_y + c_1 \Theta_{x\text{-}susp} + c_2 \dot{\Theta}_{x\text{-}susp}$$

$$\dot{w}_y = d_0 a_x + d_1 \Theta_{y\text{-}susp} + d_2 \dot{\Theta}_{y\text{-}susp} \quad (22)$$

that is, $\Theta_{x\text{-}susp}(t)$ and $\Theta_{y\text{-}susp}(t)$ obeys the $1^{st}$ order differential equations, and the coefficients $c_0, c_1, c_2, d_0, d_1$ and $d_2$ can be obtained by comparing Equation (21) and Equation (22). Although the analytical solution for Equation (22) are not hard to find, the solutions may be directly implemented in digital environment. On the other hand, the pitch rate signal is not measured, but an estimation of the pitch rate signal can be obtained as a function of the measured signals and the signals computed from the measured signals:

$$\dot{w}_y = \dot{\hat{\theta}}_y \sec(\hat{\theta}_x) + w_z \tan(\hat{\theta}_x) \quad (23)$$

where $\hat{\theta}_x$ and $\hat{\theta}_y$ are the estimated global roll and pitch Euler angles of the vehicle body (with respect to the sea level). The details if this are described in U.S. application Ser. No. 09/967,938 which is incorporated by reference herein. Using the estimated pitch rate signal, (22) can be used to solve for $\Theta_{x\text{-}susp}(t)$ and $\Theta_{y\text{-}susp}(t)$ at time instant t. In the following a digital scheme will be summarized. Two variables as defined at each sampling instant:

$$RRA\_RAW(k) = \frac{1}{c_1}\dot{\omega}_x(k) - \frac{c_0}{c_1}a_y(k) \quad (24)$$

$$RPA\_RAW(k) = \frac{1}{d_1}\dot{\omega}_y(k) - \frac{d_0}{d_1}a_x(k)$$

Then at the (k+1)th sampling instant (current values), the estimates of the roll and pitch gradients $\hat{\Theta}_{x\text{-}susp}(k+1)$ and $\hat{\Theta}_{y\text{-}susp}(k+1)$ may be computed from their values in the kth sampling instant (past values) and the current and past values of RRA_RAW and RPA_RAW. The iterative formula may be expressed as the following with properly chosen coefficients $e_0, e_1, f_0$ and $f_1$:

$$\hat{\Theta}_{x\text{-}susp}(k+1) = e_0\hat{\Theta}_{x\text{-}susp}(k) + e_1[RRA\_RAW(k+1)+RRA\_RAW(k)]$$

$$\hat{\Theta}_{y\text{-}susp}(k+1) = f_0\hat{\Theta}_{y\text{-}susp}(k) + f_1[RPA\_RAW(k+1)+RPA\_RAW(k)] \quad (25)$$

The wheel motion-induced roll and pitch gradients are usually much smaller than the suspension motion induced gradients due to the small tire deflections at each wheel/tire assembly. Therefore:

$$\Theta_{x\text{-}whl} \ll \Theta_{x\text{-}susp}$$

$$\Theta_{y\text{-}whl} \ll \Theta_{y\text{-}susp} \qquad (26)$$

or say:

$$\Theta_x \approx \Theta_{x\text{-}susp}$$

$$\Theta_y \approx \Theta_{y\text{-}susp} \qquad (27)$$

As described above, the present invention uses Equation (27) to approximately calculate the roll and pitch gradients. The relative roll and pitch attitude angles can be computed as in Equations (5) and (6).

Figure 5:
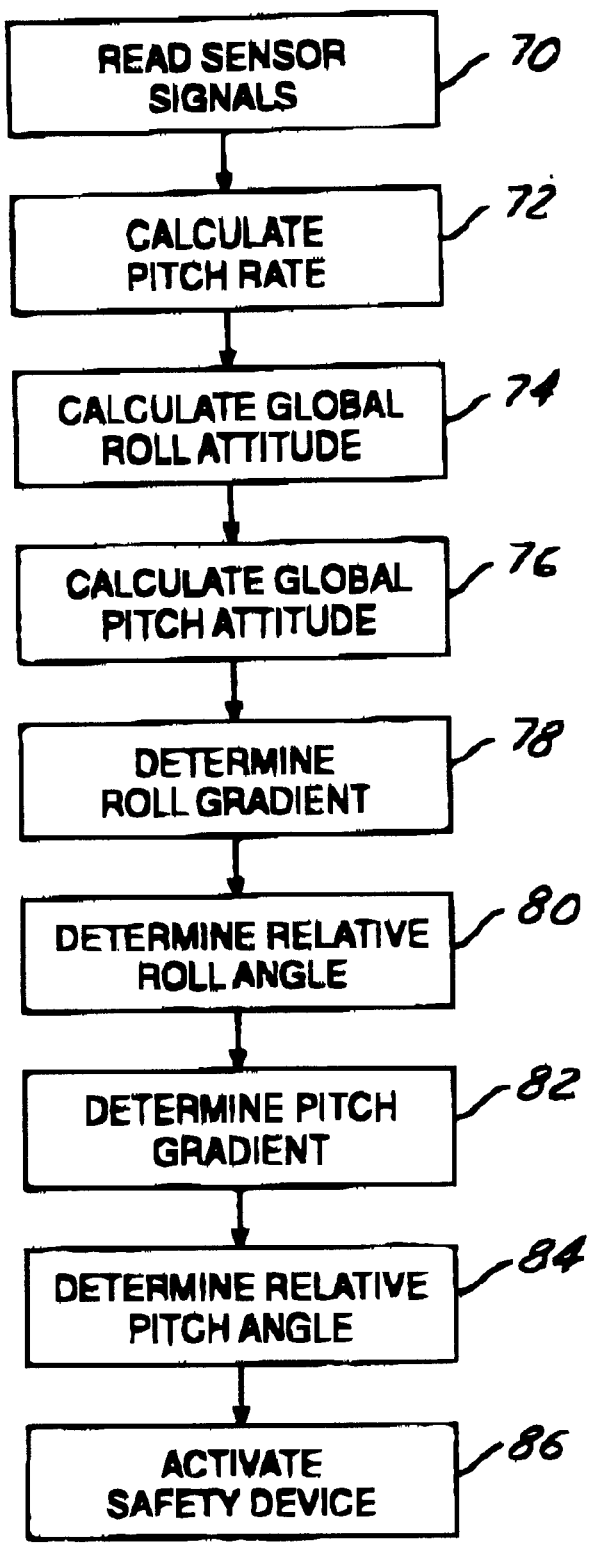
FIG. 5 is flow chart of determination according to the present invention.

Referring now to FIG. 5, a flow chart summarizing the method of the present invention is illustrated. In step 70 the sensor signals of the sensor set are read. In the present example, a roll rate sensor determines the roll rate of the vehicle, a lateral acceleration sensor generates a lateral acceleration signal of the vehicle body, and a longitudinal acceleration sensor generates a longitudinal acceleration signal of the vehicle body. The yaw rate of the vehicle body is also measured. In step 72, a calculated pitch rate signal is determined from the yaw rate, the roll rate, the lateral acceleration, and the longitudinal acceleration. In step 74 the global roll attitude and global pitch attitude are determined from the calculated pitch rate, the roll rate, the lateral acceleration, and the longitudinal acceleration. In step 78 a roll gradient is determined based upon a past roll rate and the roll rate and the lateral acceleration signal. A relative roll angle is determined in step 80 based upon the roll gradient. In step 82 a pitch gradient based upon the passive raw pitch rate, the calculated pitch rate, and the longitudinal acceleration is determined. In step 84 the relative pitch angle based upon the pitch gradient is determined. In step 86 a safety device is activated in response to the relative roll angle, the relative pitch angle, the global roll angle and the global pitch angle.

While particular embodiments of the invention have been shown and described, numerous variations and alternate embodiments will occur to those skilled in the art. Accordingly, it is intended that the invention be limited only in terms of the appended claims.

What is claimed is:

1. A control system for an automotive vehicle having a vehicle body comprising:
   a first angular rate sensor generating a first angular rate signal corresponding to a first angular motion of the vehicle body;
   a second angular rate sensor generating a second angular rate signal corresponding to a second angular motion of the vehicle body;
   a lateral accelerometer generating a lateral acceleration signal corresponding to a lateral acceleration of a center of gravity of the vehicle body;
   a longitudinal accelerometer generating a longitudinal acceleration signal corresponding to the longitudinal acceleration of the center of gravity of the vehicle body;
   a wheel speed sensor generating a wheel speed signal corresponding to a wheel speed of the vehicle; and
   a controller coupled to said first angular rate sensor, said second angular rate sensor, said lateral accelerometer, said longitudinal accelerometer, and said wheel speed sensor, said controller determining a roll gradient based upon a past raw roll rate and current raw roll rate, the first angular rate signal or the second angular rate signal and the lateral acceleration signal, a pitch gradient based upon a past raw pitch rate and current raw pitch rate, the first or second angular rate signal and the longitudinal acceleration signal, determining a relative roll and relative pitch as a function of the roll gradient and the pitch gradient.

2. A system as recited in claim 1 wherein said first angular rate sensor is one selected from the group of a yaw rate sensor, a pitch rate sensor and a roll rate sensor and said second angular rate sensor comprises is one selected from the group of a yaw rate sensor, a pitch rate sensor and a roll rate sensor, said second sensor being different than the first sensor.

3. A control system for an automotive vehicle having a vehicle body comprising:
   a roll angular rate sensor generating a roll angular rate signal corresponding to a roll angular motion of the vehicle body;
   a yaw angular rate sensor generating a yaw motion signal corresponding to a yaw motion of the vehicle body;
   a lateral accelerometer generating a lateral acceleration signal corresponding to a lateral acceleration of a center of gravity of the vehicle body;
   a longitudinal accelerometer generating a longitudinal acceleration signal corresponding to the longitudinal acceleration of the center of gravity of the vehicle body;
   a wheel speed sensor generating a wheel speed signal corresponding to a wheel speed of the vehicle; and
   a controller coupled to said roll angular rate sensor, said yaw angular rate sensor, said lateral accelerometer, said longitudinal accelerometer, and said wheel speed sensor, said controller determining a pitch rate in response to said roll angular rate signal, said yaw motion signal, said lateral acceleration signal, said longitudinal acceleraton signal, and said wheel speed signal, said controller determining a roll gradient based upon a past raw roll rate and current raw roll rate, the roll angular rate signal and the lateral acceleration signal: a pitch gradient based upon a past raw pitch rate and current raw pitch rate, the calculated pitch angular rate signal and the longitudinal acceleration signal, determining a relative roll and relative pitch as a function of the roll gradient and the pitch gradient.

4. A control system as recited in claim 3 further comprising a safety system coupled to said controller, said controller generating a control signal to said safety system in response to said relative roll angle, the relative pitch angle, a global roll attitude and a global pitch attitude.

5. A control system as recited in claim 4 wherein said safety system comprises an active brake control system.

6. A control system as recited in claim 4 wherein said safety system comprises an active rear steering system.

7. A control system as recited in claim 4 wherein said safety system comprises an active front steering system.

8. A control system as recited in claim 4 wherein said safety system comprises an active anti-roll bar system.

9. A control system as recited in claim 4 wherein said safety system comprises an active suspension system.

10. A method of controlling a rollover system for a vehicle body of an automotive vehicle comprising:
    measuring a roll rate of the vehicle body;
    measuring a lateral acceleration of the vehicle body;
    measuring a longitudinal acceleration of the vehicle body;
    measuring a yaw rate of the vehicle body;
    determining a calculated pitch rate signal from the yaw rate, the roll rate, the lateral acceleration and the longitudinal acceleration;

determining a global roll attitude and a global pitch attitude from the calculated pitch angular rate, the roll rate, lateral acceleration and the longitudinal acceleration;

determining a roll gradient based upon a past raw roll rate, the roll rate signal and the lateral acceleration signal;

determining a relative roll angle based upon said roll gradient;

determining a pitch gradient based upon a past raw pitch rate and calculated pitch rate and the longitudinal acceleration signal;

determining a relative pitch angle based upon said pitch gradient; and activating a safety device in response to the relative roll angle, the relative pitch angle, the global roll and global pitch angle.

11. A method as recited in claim 10 wherein determining a relative pitch angle comprises determining a relative pitch angle using an Euler approximation.

12. A method as recited in claim 10 wherein determining a relative roll angle comprises determining a relative roll angle using an Euler approximation.

13. A method as recited in claim 10 wherein said step of activating a safety device comprises one selected from the group consisting of an active brake control system, an active rear steering system, an active front steering system, an active anti-roll bar system, and an active suspension system.

14. A method of controlling a safety system for a vehicle body of an automotive vehicle comprising:

measuring a roll rate of the vehicle body;

measuring a lateral acceleration of the vehicle body;

measuring a longitudinal acceleration of the vehicle body;

measuring a yaw rate of the vehicle body; and determining a relative roll angle, a relative pitch angle, a global roll and a global pitch angle in response to the roll rate, the yaw rate, the lateral acceleration and the longitudinal acceleration.

* * * * *